US010803321B1

(12) United States Patent
Dalimba et al.

(10) Patent No.: US 10,803,321 B1
(45) Date of Patent: Oct. 13, 2020

(54) VISUAL-BASED AUTOMATIC VIDEO FEED SELECTION FOR A DIGITAL VIDEO PRODUCTION SYSTEM

(71) Applicant: SLING MEDIA PVT LTD, Bangaluru (IN)

(72) Inventors: Laxminarayana Dalimba, Bangalore (IN); Vivek Devaraj, Bangalore (IN); Satish Iyer, Bangalore (IN); Narayana Rao, Bangalore (IN)

(73) Assignee: SLING MEDIA PVT LTD, Bangaluru (IN)

( * ) Notice: Subject to any disclaimer, the term of this patent is extended or adjusted under 35 U.S.C. 154(b) by 0 days.

(21) Appl. No.: 16/573,215

(22) Filed: Sep. 17, 2019

(30) Foreign Application Priority Data

Jul. 30, 2019 (IN) .............................. 201941030739

(51) Int. Cl.
*G06K 9/00* (2006.01)
*H04N 21/2187* (2011.01)

(52) U.S. Cl.
CPC ..... *G06K 9/00751* (2013.01); *G06K 9/00248* (2013.01); *G06K 9/00281* (2013.01); *G06K 9/00765* (2013.01); *H04N 21/2187* (2013.01); *G06K 2009/00738* (2013.01)

(58) Field of Classification Search
CPC .................................................. G06K 9/00751
USPC ......................................................... 386/241
See application file for complete search history.

(56) References Cited

U.S. PATENT DOCUMENTS

2016/0300100 A1* 10/2016 Shen .................. G06K 9/00248
2020/0045261 A1* 2/2020 Lim .......................... G06T 7/50

\* cited by examiner

*Primary Examiner* — Eileen M Adams
*Assistant Examiner* — Daniel T Tekle
(74) *Attorney, Agent, or Firm* — Lorenz & Kopf LLP (57) ABSTRACT

A video production device is deployed to produce a video production stream of an event occurring within an environment that includes a plurality of different video capture devices capturing respective video input streams of the event. The video production device is programmed and operated to: receive a plurality of video input streams from the video capture devices; automatically select one of the video input streams as a current video output stream, in accordance with a visual activity based switching technique that identifies which of the plurality of video input streams is associated with a detected speaker; and provide the selected video input stream as the current video output stream.

11 Claims, 5 Drawing Sheets

VISUAL-BASED AUTOMATIC VIDEO FEED SELECTION FOR A DIGITAL VIDEO PRODUCTION SYSTEM

CROSS-REFERENCE TO PRIORITY APPLICATION

This application claims the benefit of, and priority to, India provisional application number 201941030739, filed Jul. 30, 2019.

TECHNICAL FIELD

Embodiments of the subject matter described herein relate generally to the production of digital video content. More particularly, embodiments of the subject matter relate to a system and related operating methodologies that automatically select one or more video feeds to be used for video processing, streaming, and/or programming.

BACKGROUND

Recent years have seen an explosion in the creation and enjoyment of digital video content. Millions of people around the world now carry mobile phones, cameras, or other devices that are capable of capturing high quality video and/or of playing back video streams in a convenient manner. Moreover, Internet sites such as YOUTUBE have provided convenient and economical sharing of live-captured video, thereby leading to an even greater demand for live video content.

More recently, video production systems have been created that allow groups of relatively non-professional users to capture one or more video feeds, to select one of the video feeds for an output stream, and to thereby produce a professional-style video of the output stream for viewing, sharing, publication, archiving and/or other purposes. Many of these systems rely upon Wi-Fi, Bluetooth, and/or other wireless communications for sharing of video feeds, control instructions and the like. A "producer" can operate a controller device that displays each of the available video feeds to select which video feed is to be displayed or processed at any given time. If all of the video capture devices are co-located and operated to capture the same event, then the producer can monitor the video feeds and manually select one of them as the currently focused feed.

In a practical deployment, however, it would be desirable to automatically select the currently focused video feed in an intelligent manner. An automatic selection methodology can reduce the workload of the producer and in certain situations can more accurately select a preferred video feed from a group of feeds that include the same content. Furthermore, other desirable features and characteristics will become apparent from the subsequent detailed description and the appended claims, taken in conjunction with the accompanying drawings and the foregoing technical field and background.

BRIEF SUMMARY

Disclosed here is an automated method of controlling a video production device that produces a video production stream of an event from a plurality of video input streams that are captured by a plurality of different video capture devices. An exemplary embodiment of the method involves the steps of: receiving the plurality of video input streams from the plurality of different video capture devices; automatically sequencing through the plurality of video input streams to select one of the plurality of video input streams as a current video output stream, in accordance with a predetermined switching sequence associated with the plurality of different video capture devices; and providing the selected video input stream as the current video output stream for a designated time interval associated with the video capture device that captured the selected video input stream, wherein each of the different video capture devices is associated with a respective time interval. The current video output stream can be produced for storage or live streaming. In certain embodiments, the event is captured by N different video capture devices, and the predetermined switching sequence identifies each of the N different video capture devices at least once. In certain embodiments, the event is captured by N different video capture devices, and the predetermined switching sequence identifies less than N of the different video capture devices.

Another exemplary embodiment of the method involves the steps of: receiving the plurality of video input streams from the plurality of different video capture devices; randomly selecting one of the plurality of video input streams as a current video output stream; and providing the randomly selected video input stream as the current video output stream for a designated time interval associated with the video capture device that captured the selected video input stream. In certain embodiments, each of the plurality of video input streams is selected once for each switching sequence. In certain embodiments, the designated time interval is randomly assigned.

Another exemplary embodiment of the method involves the steps of: receiving the plurality of video input streams from the plurality of different video capture devices; automatically selecting one of the plurality of video input streams as a current video output stream, in accordance with an audio based switching technique that identifies which of the plurality of video input streams is associated with a detected speaker; and providing the selected video input stream as the current video output stream. In certain embodiments, the audio based switching technique considers instantaneous root mean square energy of each audio stream, average root mean square energy of each audio stream over a given time period, and relative energy thresholds for each of the video capture devices.

Another exemplary embodiment of the method involves the steps of: receiving the plurality of video input streams from the plurality of different video capture devices; automatically selecting one of the plurality of video input streams as a current video output stream, in accordance with a visual activity based switching technique that identifies which of the plurality of video input streams is associated with a detected speaker; and providing the selected video input stream as the current video output stream. In certain embodiments, the visual activity based switching technique identifies and analyzes facial features and characteristics captured in the plurality of video input streams. In certain embodiments, the visual activity based switching technique identifies lip and mouth positions and calculates a distance ratio from the lip and mouth positions to identify which of the plurality of video input streams is associated with a detected speaker. In certain embodiments, the visual activity based switching technique identifies which of the plurality of video input streams is associated with a detected speaker based on a variation in a distance ratio given by the expression $$\frac{(V_T - V_B)}{(H_L - H_R)},$$

wherein HL and HR denote the positions of the corners of the mouth on the left and right sides, and VT and VB denote the positions of the top and bottom parts of the lips.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

Various embodiments improve operation of a digital video production system by automatically selecting (switching to) one video feed from a plurality of different video feeds, wherein the selected video feed is subjected to production, live streaming, or the like. The embodiments described here are particularly suitable for use in a system having multiple video capture devices operating concurrently to capture video of the same ongoing event of interest. For example, the digital video production system can be deployed in a setting such as a wedding, a concert, or a sporting event where a plurality of client devices (the video capture devices) are operated by different members of the audience. A video feed can be automatically selected using one or more of the following techniques, which are described in more detail below: (1) time based, which may be scheduled or randomized; (2) audio based; (3) video based; (4) audio/video hybrid based. In practice, these aspects may be modified, omitted and/or enhanced as desired across a wide array of alternate but equivalent embodiments.

The general concepts described herein may be implemented in any video production context, especially the capture and encoding or transcoding of live video. For convenience of illustration, the following discussion often refers to a video production system in which one or more live video streams are received from one or more cameras or other capture devices via a wireless or wired network to produce an output video stream for publication, live streaming, or other sharing. Equivalent embodiments could be implemented within other contexts, settings or applications as desired.

Figure 1:
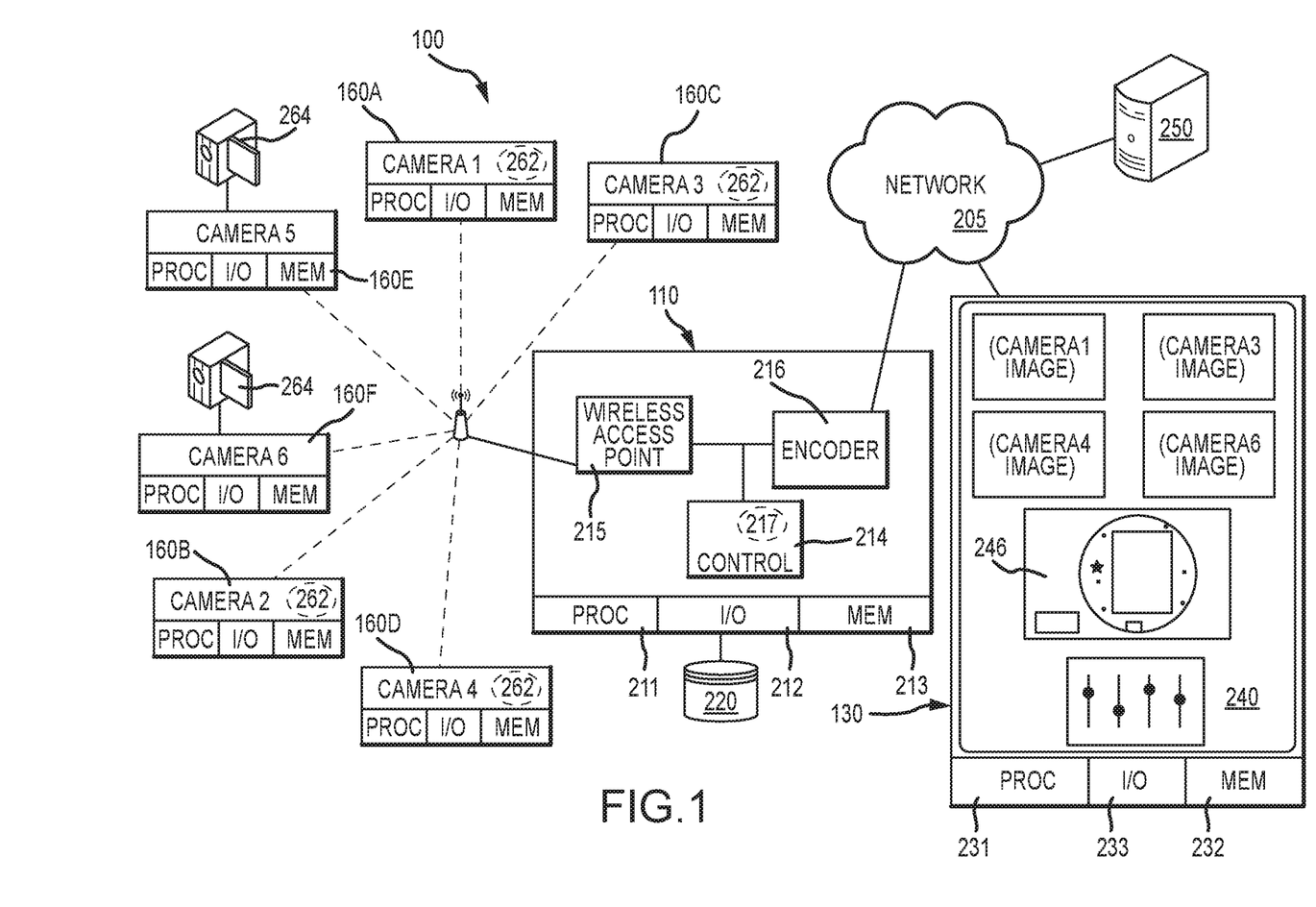
FIG. 1 is a schematic block diagram representation of a digital video production system that is arranged and configured in accordance with an exemplary embodiment of the invention.

Turning now to the drawings and with initial reference to FIG. 1, an exemplary embodiment of a digital video production system 100 includes, without limitation: a video production device 110; a plurality of video capture devices 160; a control device 130; and a hosting or distribution server system 250. The video production device 110, the video capture devices 160, and the control device 130 are all located within network communication range of each other. That said, it is not necessary that the control device 130 be located within the same environment as the video production device 110 and the video capture devices 160, because Internet or other communication methodologies may allow the control device 130 to communicate with the video production device 110 from other locations, as desired.

The video production system 100 can be used to produce a video program based upon selected inputs from multiple input video feeds. In the illustrated example, the video production device 110 includes a wireless access point 215 and an encoder 216 with appropriate encoding hardware to encode video programming based upon instructions received from the control device 130. The encoded video program may be initially stored as a file on an external storage device 220 (e.g., a memory card, hard drive, or other non-volatile storage) for eventual uploading to the hosting or distribution server system 250 operating on the Internet or another network 205. The hosting or distribution server system is suitably configured and operated to support or provide various services, such as YOUTUBE, FACEBOOK, USTREAM, TWITCH, MIXER, etc. Although the illustrated embodiment of the video production device 110 includes wireless access point and encoder functionality, equivalent embodiments could split the encoding and access point functions and employ more than one hardware device (instead of a single video production device 110).

The video production device 110 can be a processor or computer based component that includes processing hardware such as a microprocessor 211, memory 212, and input/output interfaces 213 (including a suitable USB or other interface to the external storage 220). The example illustrated in FIG. 1 shows the video production device 110 including processing logic to implement an IEEE 802.11, 802.14 or other wireless access point 215 for communicating with any number of video capture devices 160, which could include any number of mobile phones, tablets, or similar devices executing a video capture application 262, as desired. The video capture devices 160 could also include one or more conventional video cameras 264 that interact with the video production device via an interface device that receives DVI or other video inputs and transmits the received video to the video production device 110 via a Wi-Fi, Bluetooth, or other wireless network, as appropriate. Other embodiments could facilitate communications with any other types of video capture devices in any other manner.

The video production device 110 is also shown to include a controller 214 and an encoder 216, as appropriate. The controller 214 and/or the encoder 216 may be implemented as software logic stored in memory 212 and executing on processor 211 in some embodiments. The controller 214 may be implemented as a control application executing on the processor 211, for example, that includes logic 217 for implementing the various functions, features, and operations described here. Other embodiments may implement the various functions and features using hardware, software, and/or firmware logic executing on other components, as desired. The encoder 216, for example, may be implemented using a dedicated video encoder chip in some embodiments.

In various embodiments, the video production device 110 operates in response to user inputs supplied by the control device 130. The control device 130 is any sort of computing device that includes conventional processor 231, memory 232, and input/output 233 features. Various embodiments could implement the control device 130 as a tablet, laptop, or other computer system, for example, or as a mobile phone or other computing device that executes a software control application 240 for controlling the functions of the video production device 110. Typically, the control device 130 interacts with the video production device 110 via a wireless network 205, although wired connections could be equivalently used. Although FIG. 1 shows the network 205 as being separate from the wireless connections between the video production device 110 and the video capture devices 160, in practice the same Wi-Fi or other networks could be used if sufficient bandwidth is available. Other embodiments may use any other network configuration desired, including any number of additional or alternate networks or other data links.

The example illustrated in FIG. 1 shows the control application 240 having an interface that shows various video feeds received from some or all of the video capture devices 160, and that lets the user select an appropriate feed to encode into the finished product. The control application 240 may include other displays to control other behaviors or features of the system 100, as desired. In the illustrated example, a graphical user interface 246 illustrating the operating environment or layout of the video capture devices 160 is shown at the same time as the captured imagery, albeit in a separate portion of the display. In practice, however, the interface 246 may equivalently be presented on a separate screen or image than the captured content for larger presentation or ease of viewing. The interface 246 could be equivalently presented in a dashboard or similar view that presents system or device status information, as desired. Again, the presentation and appearance of the interface 246 may be very different in other embodiments, and may incorporate any different types of information or content arranged in any manner.

In operation, then, a user acting as a video producer would use the control application 240 running on the control device 130 to view the various video feeds that are available from one or more video capture devices 160. The video production device 110 receives the corresponding video feed from the selected capture device. The video production device 110 compresses or otherwise encodes the selected video data in an appropriate format for eventual viewing or distribution, e.g., via an Internet or other service provided by the hosting or distribution server system 250.

In various embodiments, the user interface 246 includes a graphical representation of a map or other physical layout of the operating environment. Additional information presented in the user interface 246 may be visually overlaid upon a map, drawing, camera image or other graphic if desired, if such graphics are available. In other embodiments, the control application 240 or the like could provide a graphical interface that allows the producer/user to draw an image of the physical environment, as desired. If the video production is intended to show a basketball game, for example, it may be desirable to draw the court floor, sidelines, baskets, etc. for later reference. If graphical imagery is not available, however, the relative locations of the different entities operating within the system may still be useful.

Location information is transmitted to the video production device 110 on any regular or irregular temporal basis, and the user interface 246 is updated as desired so that the producer user can view the locations of the various video capture devices 160. Location information can be useful in knowing which camera angles or shots are available so that different cameras can be selected for preview imagery and/or for the output stream. If a video production application is only capable of displaying four potential video feeds, for example, but more than four cameras are currently active in the system, then the locations of the various cameras may be helpful in selecting those cameras most likely to have content feeds that are of interest. Location information can also be useful in determining communication signal strength. Other embodiments may make use of additional benefits derived from knowing and/or presenting the locations of devices operating within the system, as more fully described herein.

As mentioned above, a user of the control device 130 can manually select which video feed provides the video content for production, streaming, and the like. Alternatively, the video production system 100 can be suitably configured to support one or more automatic switching/selection techniques to automatically designate which video feed is to be used. Automatically selecting a video capture device 160 (or its video feed) as the output of the video production device 110 is based on certain criteria, which may vary from one implementation to another. This description contemplates a variety of methodologies, and any or all of them can be supported by an embodiment of the system 100.

Figure 2:
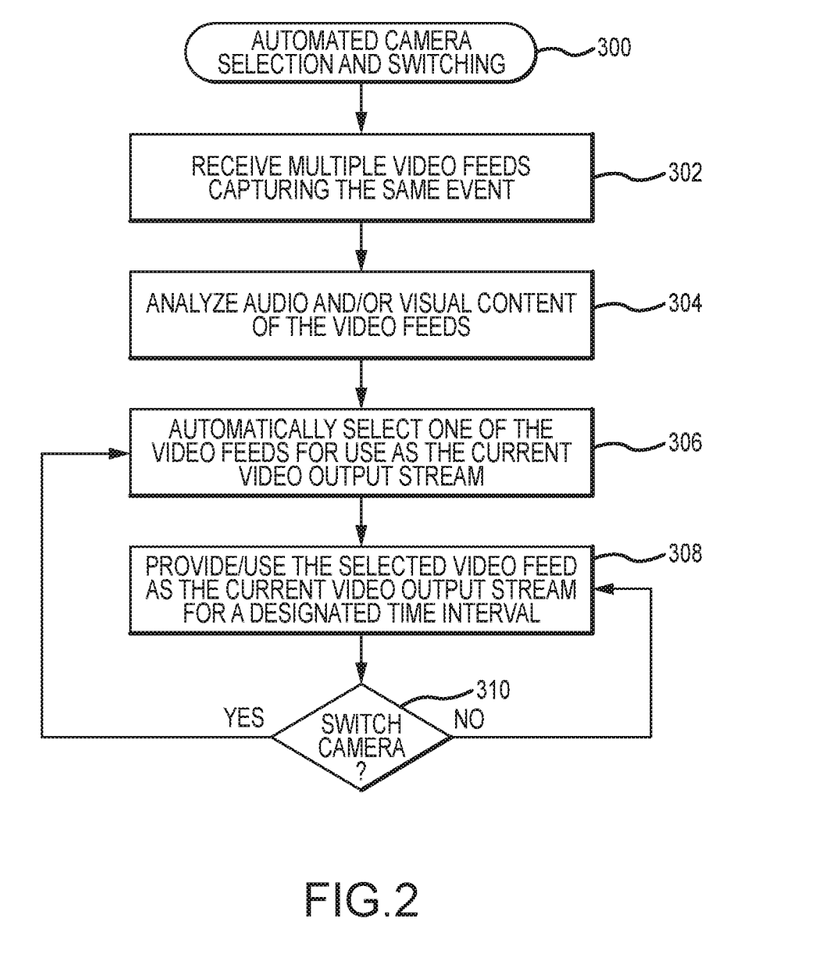
FIG. 2 is a flow chart that illustrates an exemplary embodiment of a method for operating a video production system.

FIG. 2 is a flow chart that illustrates an exemplary embodiment of a method for operating a video production system. More specifically, FIG. 2 illustrates a process 300 for automated camera selection and switching in the context of a video production system of the type mentioned previously. The various tasks performed in connection with a process described herein may be performed by software, hardware, firmware, or any combination thereof. For illustrative purposes, the description of a process may refer to elements mentioned above in connection with FIG. 1. In practice, portions of a described process may be performed by different elements of the described system, e.g., the video production device 110, the control device 130, one or more of the video capture devices 160, or the like. It should be appreciated that an embodiment of a described process may include any number of additional or alternative tasks, the tasks shown in the figures need not be performed in the illustrated order, and a described process may be incorporated into a more comprehensive procedure or process having additional functionality not described in detail herein. Moreover, one or more of the tasks shown in a figure could be omitted from an embodiment of the illustrated process as long as the intended overall functionality remains intact.

The following description of the process 300 assumes that multiple video capture devices (cameras) are capturing video of the same event. Accordingly, the process receives multiple video feeds capturing the same event (task 302). For the exemplary embodiment described here, the video feeds are received at the video production device 110 for encoding, processing, and handling as needed. The process 300 continues by analyzing the audio content and/or the visual content conveyed in the individual video feeds (task 304). In certain embodiments, task 304 is performed by the video production device 110. As mentioned above, however, some or all of the processor-intensive video data analysis may be performed by the video capture devices 160.

In response to the analysis performed at task 304, the process automatically selects one of the video feeds for use as the current video output stream (task 306). The selected video feed can be provided as a live or substantially live video stream to any number of end users, or it can be recorded/stored for subsequent processing or editing. In this regard, the selected video feed data can be stored at the video production device 110, at the control device 130, at the hosting or distribution server system 250, at the source video capture devices 160, and/or elsewhere in the system if so desired. Task 306 employs at least one of the automatic selection techniques described above. The selected video feed can be provided or otherwise used as the current video output stream for a designated time interval (task 308). As described previously, the system may be configured to cycle through the available video feeds according to a predetermined schedule, in a random order, in a pseudorandom order, or the like, and with predetermined, random, or pseudorandom time intervals associated with the different video capture devices.

If the process 300 determines that it is time to switch cameras (the "Yes" branch of query task 310), then the next video feed is automatically selected according to the particular methodology used by the system. In other words, the process 300 returns to task 306. If it is not time to switch cameras (the "No" branch of query task 310), then the currently selected video feed remains active as the designated video output stream. In other words, the process 300 returns to task 308 and continues as described above.

Time Based Selection—Scheduled

In accordance with this methodology, different video capture devices 160 are automatically selected at designated time intervals, or based on a preset schedule. The switching or cycling order can be configured by the user, it can be preset by a component of the video production system 100, or it can be randomly selected and saved by the control device 130, the video production device 110, or another device in the video production system 100. Similarly, the individual time intervals for each video capture device 160 can be set by the user, they can be preset by a component of the system 100, or they can be randomly assigned by a component of the system 100. As one example, assume that there are four video capture devices (Camera 1, Camera 2, Camera 3, and Camera 4), with assigned time intervals (T1, T2, T3, and T4, respectively). A switching sequence can be automatically carried out in the following manner: switch to Camera 1 and process its video feed for the time interval T1; then switch to Camera 2 and process its video feed for the time interval T2; then switch to Camera 3 and process its video feed for the time interval T3; switch to Camera 4 and process its video for the time interval T4; and repeat as needed.

The individual time intervals can be designated by the operator in any appropriate manner. Moreover, the switching order need not include all of the available video capture devices. For example, if there are six video capture devices 160 operating in the area, the system 100 can be configured to cycle through only three of them for a given period of time. Thereafter, the system 100 might be programmed to cycle through a different subset of the six video capture devices 160. The particular automatic switching sequence followed by the video production system 100 can be configured and set in any desired manner that is supported by the features and functionality of the control device 130.

Figure 3:
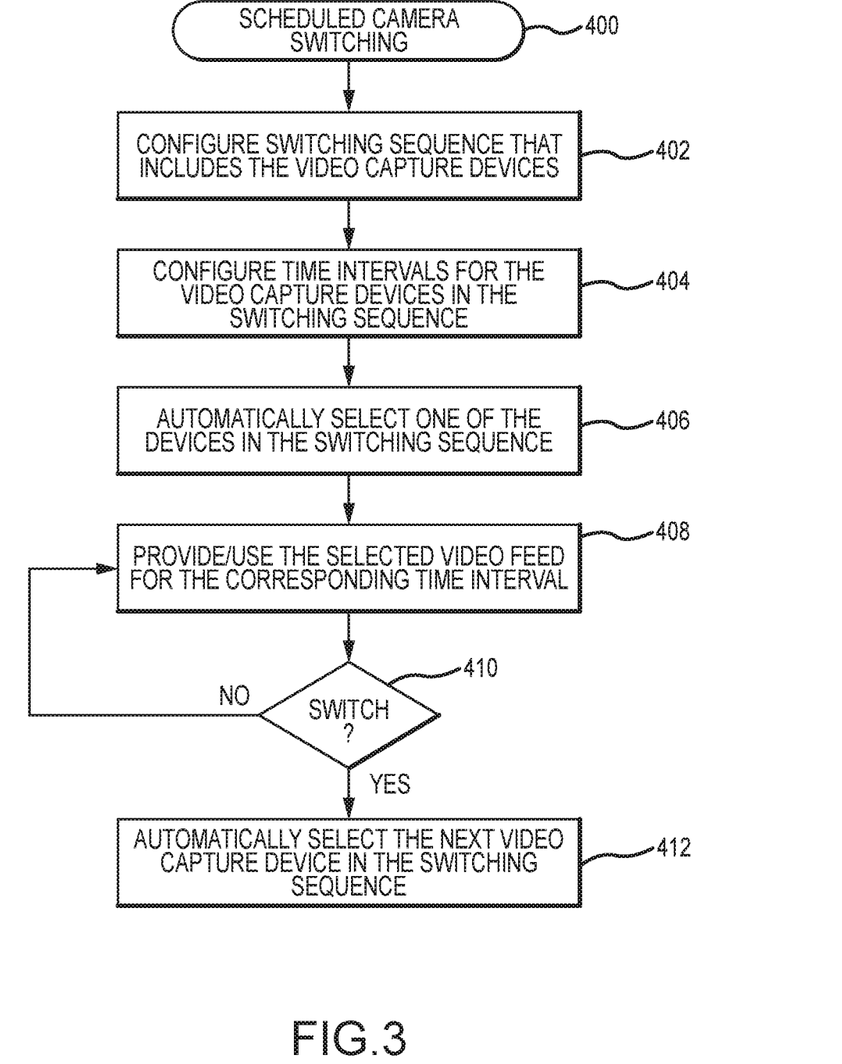
FIG. 3 is a flow chart that illustrates tasks associated with a time-based or scheduled camera switching methodology.

FIG. 3 is a flow chart that illustrates tasks associated with a time-based or scheduled camera switching process 400. The illustrated embodiment of the process 400 configures a switching sequence that includes or is otherwise associated with the video capture devices (task 402). Task 402 may be automatically performed or it may involve a user or operator of the system. Once the switching sequence has been configured or defined, it can serve as the predetermined switching sequence during operation of the video production system. In certain embodiments, the event is captured by N different video capture devices, and the predetermined switching sequence is configured to identify each of the N different video capture devices at least once. Alternatively, the predetermined switching sequence can be defined to identify less than N of the different video capture devices. For example, two cameras may be deemed to be redundant, a camera may be of low quality, or a camera may be capturing the event from an undesirable location; in these and other situations one or more cameras can be omitted without penalty. In such situations, the operator/producer may choose to disregard one or more of the available cameras. The process 400 may also configure or define the time intervals for each of the video capture devices in the switching sequence (task 404). In practice, the time intervals associated with the video capture devices can be user-configurable, automatically defined, randomly assigned, or the like. In certain embodiments, a minimum length of time and/or a maximum length of time is used when defining each time interval.

The process 400 continues by automatically sequencing through the video input streams in accordance with the predetermined switching sequence, which corresponds to the different video capture devices. To this end, the process 400 automatically selects one of the video capture devices and its associated video input stream (task 406). The selected video stream serves as the current video output stream, which is provided for the designated time interval that is associated with the originating video capture device (task 408). At the end of the current time interval, camera switching is triggered (the "Yes" branch of query task 410), the process 400 automatically selects the next video capture device in the switching sequence (task 412), and the process 400 provides the corresponding video stream as the output stream for production or editing.

Time Based Selection—Randomized

Rather than following a predetermined switching schedule as described in the previous section of this description, the different video capture devices 160 can be selected in a wholly or partially randomized manner. In a wholly randomized implementation, the video capture device 160 (which is to be used for production or streaming) is randomly selected. Moreover, if the selected video capture device 160 has a variable time interval associated with it, then that particular time interval can be randomly set. To avoid selecting any given video capture device 160 more than the others, the system can be designed to ensure that all of the available (or designated) video capture devices 160 are used during one cycle or iteration, but in a random order. In a partially randomized implementation, either the switching order or the time intervals (but not both) are randomized. For example, the time intervals assigned to each video capture device 160 may be the same (or be fixed by a setting), with the switching order randomized. As another example, the switching order can be fixed, with any or all of the time intervals being randomized.

Activity Based Selection—Audio Detection

For this methodology, the selection of a particular video capture device 160 depends on whether or not that device is capturing any kind of significant audible activity, relative to the other video capture devices 160 in the area. Thus, the automatic switching methodology and selection of a particular video capture device 160 is based on voice activity detected by the microphone of that device. In a simple setup where there are two speakers S1 and S2 located in front of two cameras C1 and C2, respectively, the automatic switching methodology should result in the following: (1) if S1 is speaking, then C1 is automatically selected; (2) if S2 is speaking, then C2 is automatically selected; (3) if both S1 and S2 are speaking at about the same level or volume, then either C1 or C2 is automatically selected; (4) if both S1 and S2 are speaking at significantly or detectably different levels or volumes, then the camera associated with the loudest speaker is automatically selected. Accordingly, in a video conferencing system having multiple cameras pointing towards one or more users, the automatic selection/switching is performed to identify the camera corresponding to the user who is currently speaking.

The specific audio detection scheme, methodology, and algorithm may vary from one implementation to another, and from one system configuration to another. An exemplary audio based automatic selection scheme is described here as one suitable example. The methodology presented here is based on root mean square (RMS) energy and average monitoring of the RMS energy.

The RMS energy of the captured audio is considered to be the primary factor in deciding whether a particular camera is capturing voice activity. In a loose sense, the RMS energy of the audio refers to the amount of continuous energy present in the audio signal as opposed to peak energy (which is the maximum energy or level present in the audio signal). By monitoring the RMS energy of the audio signals captured by each camera, it is possible to determine voice activity in each video feed.

Audio based detection schemes can be challenging to implement for some practical applications. For example, sensitivity can be problematic in voice based switching systems due to the following issues, and potentially other issues: (1) different people naturally speak at different levels; (2) the same person may modulate the volume of his voice depending on the circumstances; (3) the sensitivity rating or specification of the microphones used by the video capture devices 160 can vary from one device to another, from one manufacturer to another, from one device model to another, and the like. Another practical challenge relates to the physical layout and location of the video capture devices 160. In this regard, the distance between the user and the camera's microphone can affect the audio level captured by the microphone. Another practical challenge relates to the presence and detection of ambient sound in the surrounding environment, which may contribute to the amount of audio energy captured by a microphone. Another practical challenge relates to device contention, wherein multiple cameras can be active at any given point in time if there are different users speaking at the same time.

The instantaneous RMS energy of an audio stream is the RMS energy value of the audio at any given point in time. The average RMS energy of an audio stream is the average of the instantaneous RMS energy values of the audio stream taken over a given time period. The average RMS energy that is calculated over a window that moves in time is defined as the window average RMS energy of the audio stream. In a practical implementation of the system, by monitoring the window average EMS energy of the audio stream, any changes in the RMS energy of the audio stream can be detected. Because the average is monitored, sudden and momentary changes in the RMS energy will not affect the automatic switching/selection decision.

The time windowing mentioned above can be implemented in at least two ways: (1) a window of fixed length where the start and end points of the window "shift" with the passage of time; and (2) a window having a fixed start point and an end point that moves with the passage of time. In both implementations, with every new instant of time, a new average RMS energy value is calculated. The latest average RMS energy value in the window corresponds to the value calculated at that instant of time. The other values in the window are considered the historical data or past values at that instant of time. In the case of a window of fixed length, the decision is affected only by the values that are currently in the window and is better than a window having a fixed starting point because in a window with a fixed starting point, as time progresses, the decisions are affected by values that were calculated a very long time ago which may become undesirable.

Relative Decision—Since the sensitivity of different cameras varies, it is not feasible to directly compare the absolute RMS energy values of one camera to another. To overcome this challenge, the automatic decision is made by comparing the average RMS energy values of a camera with historical values of that same camera. In this context, the historical values refer to the average RMS energy values that have already been calculated in the past, and are part of the time window of interest. The decision for each camera system is arrived at independently, and then the final decision is made based on the individual decisions. For example, in a simple system with only two cameras (C1 and C2), the audio from the cameras (A1 and A2, respectively) is analyzed independently. The average RMS energy values of A1 and A2 (E1 and E2, respectively) are calculated for a given window length, N. If at any given time C1 is capturing voice activity and C2 is not, then the independent decisions (D1 and D2, respectively) would be D1=1 and D2=0. According to this nomenclature, a switching/selection decision of D=1 means that the camera is selected, and a switching/selection decision of D=0 means that the camera is not selected. Therefore, for this example, camera C1 is automatically selected, and camera C2 is not selected.

Automatic Thresholding—The system can perform monitoring to determine thresholds and counter sensitivity. In this regard, the decisions (D1 and D2) are made based on whether the average RMS energy values of C1 and C2 change by a certain threshold value. Since the sensitivities are different, the same threshold value cannot be used for different cameras. Instead, a relative threshold is determined for each camera in the system. The relative threshold can be arrived at by initially monitoring the audio stream for a short duration of time to establish the base audio level.

Minimum Duration—At any given point, more than one camera can be active. Depending on the relative thresholds, there might be a continuous switching between multiple cameras within a short period of time. This artifact is undesirable. To avoid this, the system can utilize a minimum switching duration. In this regard, after automatically switching to a particular camera, that camera will remain selected for at least a minimum period of time regardless of the detected audio levels. This feature can be implemented by suspending audio processing of the video feeds for the desired amount of time.

Default Camera—As mentioned previously, there might be a scenario where multiple cameras are active at a given time. One possible solution to this challenge is to automatically select only one of the active cameras. However, if there is a camera present in the system that is capturing video of all active speakers, then the system can automatically select that camera (instead of another camera that is capturing video of only one user, or is capturing video of less than all of the actively speaking users). A camera selected in this manner can be designated as the default camera. The default camera can be automatically selected when multiple cameras are in contention.

An exemplary implementation of an audio based automatic camera selection methodology will now be described. For an N-camera system, the audio streams from each camera are separated to obtain the individual audio streams $A_1$-$A_N$. For each audio stream, the instantaneous RMS energy, $E_i$ is calculated, where "i" denotes the time instant. At the start of the system, for a given time duration T, the instantaneous RMS energy of each audio stream is monitored to obtain the base level, $E_0$. Based on this, the individual threshold for each camera is calculated as $T_x$=f $(E_x)$, for x=1 . . . N. Once the threshold are calculated, the decision phase begins. This methodology can be utilized to calculate device-specific energy threshold values during an initial training period that is associated with an operating session of the system and/or the video capture devices. Training to obtain the threshold values may be performed whenever the video production system is set up for a new event, on demand or upon user request, according to a schedule, or the like. In practice, the thresholds can be obtained empirically during the monitoring phase (automatic thresholding). Thresholds in the range of about 130% to 140% of the base level can be used in a typical application.

During the decision phase, for each instantaneous RMS energy value sample, given the window length, SAMPLE_WINDOW_LENGTH and cumulative average window length, CUMULATIVE_AVERAGE_WINDOW_LENGTH, the window moves by one sample. Accordingly, Cumulative Average Including New Sample=Total Sum/Total Length, where Total Sum=CUMULATIVE_AVERAGE_WINDOW_LENGTH. In these expressions, SAMPLE_WINDOW_LENGTH is the window length used to obtain new RMS energy values. For example, if the audio is sampled once every 30 milliseconds, then a window length of 33 would hold the RMS energy values of 1 second worth of audio. The term CUMULATIVE_AVERAGE_WINDOW_LENGTH is the window length used to obtain average RMS energy values. This will be larger than the SAMPLE_WINDOW_LENGTH; usually an integral multiple. As one non-limiting example, if SAMPLE_WINDOW_LENGTH=33, then CUMULATIVE_AVERAGE_WINDOW_LENGTH would be 180. Total Length is the total window length, which in this case is the same as the CUMULATIVE_AVERAGE_WINDOW_LENGTH.

Starting with a cumulative sum of zero, to detect when the RMS energy of the audio stream increases beyond its corresponding threshold, the cumulative sum for each sample is calculated as MAX(0, Previous Cumulative Sum+Current Sample−Tolerance Factor), where Tolerance Factor is $$\frac{T_x}{2}.$$

This means that for each sample that is greater than the previous average, the cumulative sum increases by a factor of (Current Sample Tolerance Factor). If the audio stream includes continuous samples of high RMS energy compared to its previous values, then the cumulative sum steadily increases over time. The Tolerance Factor can be adjusted based on how fast a decision has to be made by compromising on accuracy. For example, if a faster decision is required, then the Tolerance Factor can be set to zero.

Once the values for all the cameras are calculated, the individual decisions $D_1$-$D_N$ are obtained based on whether the cumulative sum for a particular camera is above the threshold. With this, the final decision is made as follows. Based on the individual decisions, determine the subset of cameras, $C_p$, for which $D_x$=1. From all cameras where $D_x$=0, find the subset of cameras, Cq, where the cumulative sum for a particular camera is greater than half the corresponding threshold. Then:

If (MAX CUMULATIVE SUM ($C_p$)−MAX CUMULATIVE SUM ($C_q$)<Contention Resolution Threshold, Switch to Default Camera Else, Switch to MAX CUMULATIVE SUM ($C_p$)

This process is repeated for each new sample. To avoid frequent switching when multiple cameras are active, the default camera is given a higher precedence by enforcing that after switching to the default camera, there will not be another change for at least a minimum duration of time $T_{min}$. As a non-limiting example, the minimum duration of time for the default camera might be five seconds, while the minimum duration of time for other cameras (non-default cameras) might be only two seconds.

Figure 4:
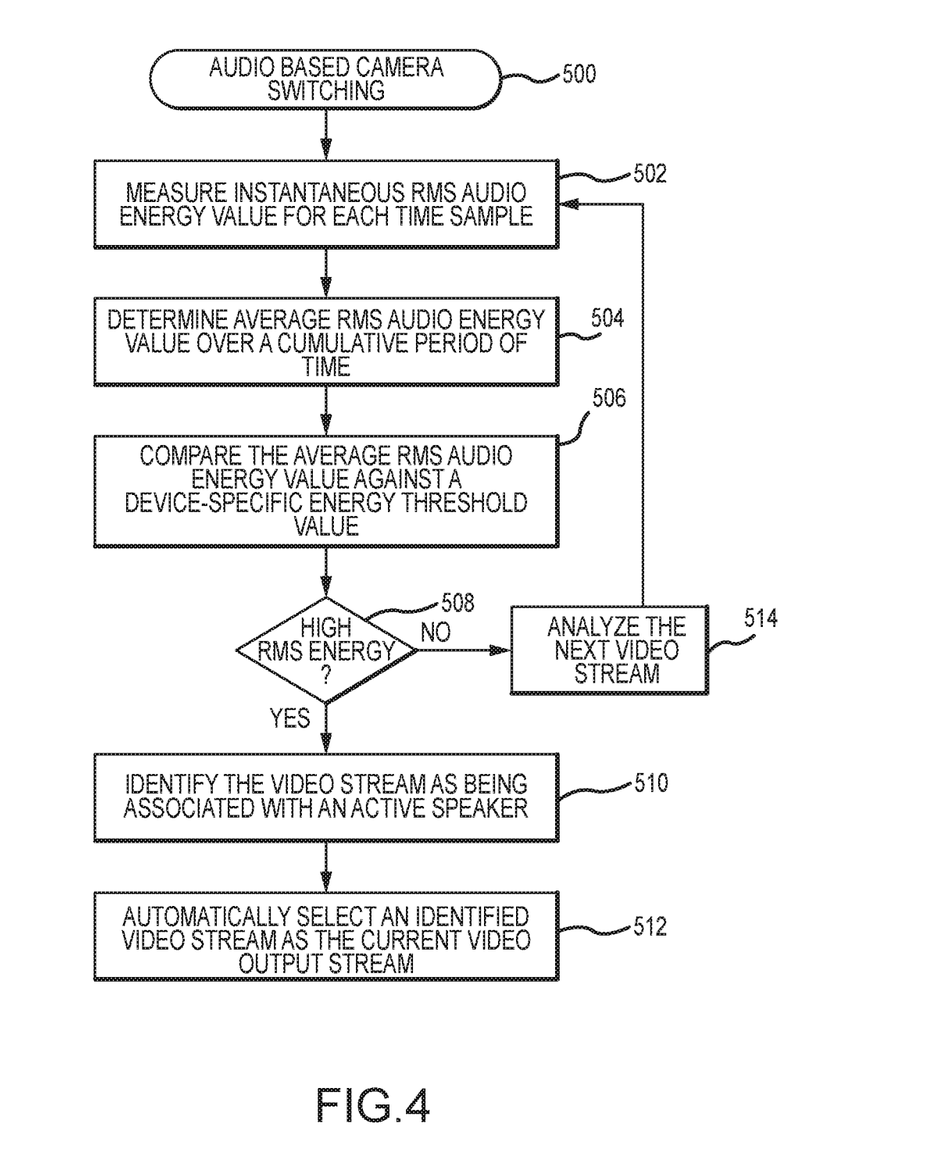
FIG. 4 is a flow chart that illustrates tasks associated with an audio-based camera switching methodology.

FIG. 4 is a flow chart that illustrates tasks associated with an audio-based camera switching process 500. For ease of description, the process 500 will be described with reference to one video stream. In practice, the process 500 can handle and analyze multiple video streams in a concurrent manner. The illustrated embodiment of the process 500 measures the instantaneous RMS audio energy value of the video input stream, for each time sample (task 502). The process 500 continues by determining the average RMS audio energy value over a period of time, e.g., the cumulative period of time associated with operation of the video production system (task 504). In practice, a device-specific average RMS value is calculated for each video capture device of interest.

The average RMS audio energy value determined at task 504 is compared against a respective device-specific energy threshold value (task 506). As mentioned above, the threshold value serves as an indicator or trigger for purposes of detecting whether the video stream contains an amount of sound energy that might be associated with an active speaker. Therefore, if the process 500 detects high RMS energy (the "Yes" branch of query task 508), then the system identifies the video stream as being associated with an active speaker (task 510). For this particular embodiment, high RMS energy is indicated when the device-specific average RMS value for the video capture device exceeds the respective device-specific energy threshold value for that video capture device. If high RMS energy is not detected (the "No" branch of query task 508), then the process 500 continues by analyzing the next video input stream (task 514) in the manner described above.

Eventually, the process 500 considers all of the video streams of interest and identifies which of the video input streams is associated with an active speaker. The process 500 automatically selects one of the identified video input streams for use as the current video output stream (task 512). The system continues by providing the selected video stream as the output stream for production or editing, as described previously.

Activity Based Selection—Visual Detection

For this methodology, the selection of a particular video capture device 160 depends on whether or not the video content captured by that device indicates a certain amount of movement or motion (of a speaker's mouth, lips, facial expression, etc.), relative to the video feeds of the other video capture devices 160 in the area.

Visual activity based automatic switching considers the amount and/or characteristics of detected visual activity. To identify the active speaker, facial features of the speaker are extracted from the captured video stream. This is accomplished by identifying faces present in the video frame. Once the faces are identified, bounding boxes for facial regions are created. Using the bounding boxes, the region of interest (in this case, the mouth region) is extracted using machine learning models that are trained to extract facial features from the video frame. From the extracted mouth region, a set of coordinates that describe the upper lip and lower lip positions are calculated. Using these coordinates, the ratio of the distances between the upper lip and the lower lip is calculated. By monitoring the variation in this ratio over time, it can be determined whether the captured video includes contains an active speaker.

An exemplary implementation of a visual based automatic camera selection methodology will now be described. For an N-camera system, the video streams from each camera are separated to obtain the individual video streams $V_1$-$V_N$. For each video stream, a face detection or facial feature detection methodology is utilized, such as the Histogram of Oriented Gradients (HOG) method. For each detected face, the facial features are extracted using a facial landmark extraction model. The HOG method and facial landmark extraction models are known, and the exemplary embodiment described here can leverage suitable methodologies as needed.

For this description, Hz, and HR denote the positions of the corners of the mouth on the left and right sides, and VT and VB denote the positions of the top and bottom parts of the lips. The distance ratio is given by the following expression:

$$\frac{(V_T - V_B)}{(H_L - H_R)}.$$

It the speaker's lips are closed, then the distance ratio will be close to zero; otherwise it will be a positive number. For each video stream, the variation of the distance ratio is calculated continuously during a window of time. In practice, the distance ratio can be calculated for each video frame (if, for example, the video feed includes 30 frames per second, then the distance ratio can be calculated up to 30 times per second if so desired). If the variation from one sample to the next sample exceeds a threshold value, then the corresponding camera is automatically selected under the assumption that the detected movement of the lips/mouth indicates an active speaker. If more than one video feed indicates an active speaker determined by this methodology, then the system can automatically select the camera that corresponds to the highest calculated distance ratio.

Figure 5:
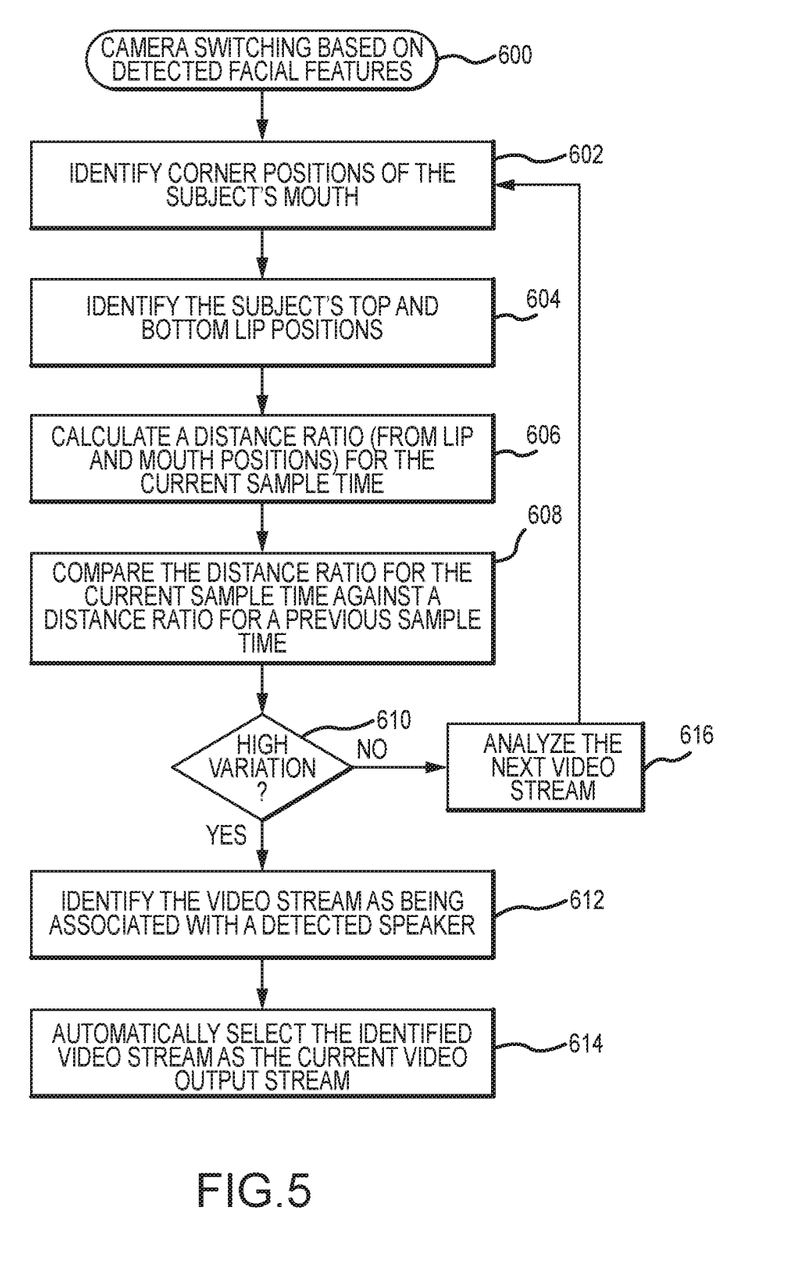
FIG. 5 is a flow chart that illustrates tasks associated with a camera switching methodology that is based on detected facial features.

FIG. 5 is a flow chart that illustrates tasks associated with a camera switching process 600 that is based on detected facial features. Process 600 represents one exemplary embodiment of a visual activity based switching technique that identifies and analyzes facial features and characteristics that are captured in the video input streams. For ease of description, the process 600 will be described with reference to one video stream. In practice, the process 600 can handle and analyze multiple video streams in a concurrent manner. The illustrated embodiment of the process 600 identifies the left and right corner positions of the subject's mouth (task 602), and identifies the subject's top and bottom lip positions (task 604). These identified features are used to calculate the distance ratio for the current sample time (task 606), in accordance with the expression described above.

The process 600 continues by comparing the distance ratio calculated for the current sample time against at least one historical distance ratio, which is calculated for a previous sample time (task 608). If the variation in the distance ratio is high (i.e., it exceeds a predetermined threshold value), then the "Yes" branch of query task 610 leads to a task 612. If not, then the next video stream of interest is analyzed (task 616). At task 612, the process 600 identifies the video stream as being associated with a detected speaker (due to the high sample-to-sample variation in the calculated distance ratios). The identified video stream is automatically selected to serve as the current video output stream (task 614).

In certain scenarios, the methodology described above may correctly detect multiple speakers, corresponding to a plurality of different video streams and different video capture devices. In such scenarios, the process 600 may determine which of the video input streams corresponds to a highest calculated distance ratio and automatically select that video input stream as the current video output stream. This feature assumes that a higher distance ratio is indicative of a more active speaker and/or a louder speaker. In practice, the system may employ other techniques and methodologies to resolve ambiguity or conflicts, and to otherwise choose one video stream from a plurality of viable candidate streams.

Activity Based Selection—Hybrid Audio/Visual Detection

For this methodology, the selection of a particular video capture device 160 is based on a combination of the audio detection and visual detection schemes described above. A hybrid approach helps in making reinforced decisions and improves the automatic switching accuracy. The audio and video streams captured by a camera are separated and independently processed. The outcome of the independent processing (in the manner described above) is used to arrive at the final decision. For example, if the audio based methodology identifies two or more selectable cameras, then the visual based methodology can provide additional information for use in the selection process. Conversely, if the visual based methodology identifies two or more selectable cameras, then the audio based methodology can provide additional information for use in the selection process.

Typical Use Cases

The automatic selection techniques described above can be utilized in the context of different environments, scenarios, and applications. The following are exemplary use cases for the described methodologies; other use cases can be supported if so desired.

Scenario 1: Interview

An interview scenario includes front facing video capture devices focused on the individual participants. The video capture devices are located in the same environment, such as an office or a conference room.

Scenario 2: Remote Conferencing

A remote conference includes a plurality of users with front facing video capture devices focused on the individual participants. These video capture devices are located in the same environment, such as an office or a conference room. At least one remote user is supported. Moreover, the operating environment includes a default video capture device that is set to capture some or all of the users in the shared environment. The automatic selection routine can switch between the individual cameras and the default camera as needed.

Scenario 3: Discussion Room

A discussion scenario may include front facing video capture devices focused on the individual participants. The video capture devices are located in the same environment, such as an office or a conference room. The video feeds capture an ongoing discussion between the users.

Scenario 4: Discussion Between Different Locations

In this scenario, users are physically located in different rooms. Accordingly, the distance between the camera and the user does not affect automatic switching. Moreover, environmental noise and "crosstalk" are less problematic. Nonetheless, the automatic camera selection methodologies described herein can still be utilized effectively.

The methodologies and processes described herein are automated in that they are performed by a computer-implemented or processor-implemented device. Depending on the particular system configuration and device specifications, the processing may take place at the video production device 110, the control device 130, and/or one more of the video capture devices 160. In accordance with certain exemplary embodiments, the automatic camera switching/selection intelligence and processing power resides at the video production device 110. In alternative embodiments, the automatic camera switching/selection intelligence and processing power resides at the control device 130. In certain implementations (e.g., those that rely on visual detection schemes), the video capture devices 160 can be leveraged and utilized to perform the processor-intensive analysis and handling of the source video data. In this regard, a suitably designed mobile app running on a video capture device 160 can perform at least some of the functions described here.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An automated method of controlling a video production device that produces a video production stream of an event from a plurality of video input streams that are captured by a plurality of different video capture devices, the method comprising:
  receiving the plurality of video input streams from the plurality of different video capture devices;
  automatically selecting one of the plurality of video input streams as a current video output stream, in accordance with a visual activity based switching technique that identifies which of the plurality of video input streams is associated with a detected speaker; and
  providing the selected video input stream as the current video output stream;
  wherein the visual activity based switching technique identifies and analyzes lip and mouth positions captured in the plurality of video input streams, and calculates a distance ratio from the lip and mouth positions to identify which of the plurality of video input streams is associated with a detected speaker; and
  wherein the visual activity based switching technique identifies which of the plurality of video input streams is associated with a detected speaker based on a variation in distance ratio given by the expression $$\frac{(V_T - V_B)}{(H_L - H_R)},$$

wherein $H_L$ and $H_R$ denote left and right corner positions of the mouth of the detected speaker, and wherein $V_T$ and $V_B$ denote top and bottom lip positions of the detected speaker.

2. The method of claim 1, further comprising the step of producing the current video output stream for storage or live streaming.

3. The method of claim 1, wherein the visual activity based switching technique identifies the detected speaker when sample-to-sample variation in the distance ratio exceeds a threshold value.

4. The method of claim 1, wherein the visual activity based switching technique determines which of the plurality of video input streams corresponds to a highest calculated distance ratio, and automatically selects the determined video input stream as the current video output stream.

5. A video production device for producing a video production stream of an event occurring within an environment that includes a plurality of different video capture devices capturing respective video input streams of the event, the video production device comprising:
a processor hardware device; and
a memory storage device to store processor-executable instructions that are configurable to be executed by the processor hardware device to perform a method comprising the steps of:
receiving a plurality of video input streams from the plurality of different video capture devices;
automatically selecting one of the plurality of video input streams as a current video output stream, in accordance with a visual activity based switching technique that identifies which of the plurality of video input streams is associated with a detected speaker; and
providing the selected video input stream as the current video output stream;
wherein the visual activity based switching technique identifies and analyzes lip and mouth positions captured in the plurality of video input streams, and calculates a distance ratio from the lip and mouth positions to identify which of the plurality of video input streams is associated with a detected speaker; and
wherein the visual activity based switching technique identifies which of the plurality of video input streams is associated with a detected speaker based on a variation in distance ratio given by the expression $$\frac{(V_T - V_B)}{(H_L - H_R)},$$

wherein $H_L$ and $H_R$ denote left and right corner positions of the mouth of the detected speaker, and wherein $V_T$ and $V_B$ denote top and bottom lip positions of the detected speaker.

6. The video production device of claim 5, wherein the method performed by the processor hardware device further comprises the step of producing the current video output stream for storage or live streaming.

7. The video production device of claim 5, wherein the visual activity based switching technique identifies the detected speaker when sample-to-sample variation in the distance ratio exceeds a threshold value.

8. The video production device of claim 5, wherein the visual activity based switching technique determines which of the plurality of video input streams corresponds to a highest calculated distance ratio, and automatically selects the determined video input stream as the current video output stream.

9. A video production system comprising:
a plurality of video capture devices; and
a video production device to wirelessly communicate with the plurality of video capture devices within a wireless network established by the video production device, the video production device comprising a processor hardware device and a memory storage device to store processor-executable instructions that are configurable to be executed by the processor hardware device to perform a method comprising the steps of:
receiving a plurality of video input streams from the plurality of different video capture devices;
automatically selecting one of the plurality of video input streams as a current video output stream, in accordance with a visual activity based switching technique that identifies which of the plurality of video input streams is associated with a detected speaker; and
providing the selected video input stream as the current video output stream;
wherein the visual activity based switching technique identifies and analyzes lip and mouth positions captured in the plurality of video input streams, and calculates a distance ratio from the lip and mouth positions to identify which of the plurality of video input streams is associated with a detected speaker; and
wherein the visual activity based switching technique identifies which of the plurality of video input streams is associated with a detected speaker based on a variation in distance ratio given by the expression $$\frac{(V_T - V_B)}{(H_L - H_R)},$$

wherein $H_L$ and $H_R$ denote left and right corner positions of the mouth of the detected speaker, and wherein $V_T$ and $V_B$ denote top and bottom lip positions of the detected speaker.

10. The video production system of claim 9, wherein the visual activity based switching technique identifies the detected speaker when sample-to-sample variation in the distance ratio exceeds a threshold value.

11. The video production system of claim 9, wherein the visual activity based switching technique determines which of the plurality of video input streams corresponds to a highest calculated distance ratio, and automatically selects the determined video input stream as the current video output stream.

* * * * *